(12) United States Patent
Zhu et al.

(10) Patent No.: US 9,996,635 B2
(45) Date of Patent: Jun. 12, 2018

(54) METHOD OF FREEFORM IMAGING LENS

(71) Applicants: Tsinghua University, Beijing (CN); HON HAI PRECISION INDUSTRY CO., LTD., New Taipei (TW)

(72) Inventors: Jun Zhu, Beijing (CN); Tong Yang, Beijing (CN); Guo-Fan Jin, Beijing (CN); Shou-Shan Fan, Beijing (CN)

(73) Assignees: Tsinghua University, Beijing (CN); HON HAI PRECISION INDUSTRY CO., LTD., New Taipei (TW)

( * ) Notice: Subject to any disclaimer, the term of this patent is extended or adjusted under 35 U.S.C. 154(b) by 704 days.

(21) Appl. No.: 14/316,739

(22) Filed: Jun. 26, 2014

(65) Prior Publication Data
US 2015/0094993 A1    Apr. 2, 2015

(30) Foreign Application Priority Data
Sep. 30, 2013    (CN) .......................... 2013 1 0457594

(51) Int. Cl.
G06G 7/48    (2006.01)
G06F 17/50    (2006.01)
G02B 3/02    (2006.01)
G02B 27/00    (2006.01)

(52) U.S. Cl.
CPC ............... *G06F 17/50* (2013.01); *G02B 3/02* (2013.01); *G02B 27/0012* (2013.01); *G06F 2217/06* (2013.01)

(58) Field of Classification Search
CPC ........................................................ G06F 17/50
USPC .............................................................. 703/6
See application file for complete search history.

(56) References Cited

PUBLICATIONS

Ries et al.: Tailored freeform optical surfaces; J. Opt. Soc. Am. A/vol. 19, No. 3/Mar. 2002; pp. 590-595.*

* cited by examiner

*Primary Examiner* — Hugh Jones
(74) *Attorney, Agent, or Firm* — ScienBiziP, P.C.

(57) ABSTRACT

A design method of freeform imaging lens with a wide linear field-of-view (FOV) is provided. A initial freeform imaging lens is developed, and the initial freeform imaging lens includes a first lens surface and an entrance pupil spaced from each other, wherein the FOV of the system 2ω (±ω) is divided into 2k+1 sampling fields with equal interval Δω between each two adjacent sampling fields. Each two adjacent sampling fields are taken as one group. Two constraints are employed to calculate the plurality of data points of the first lens surface to obtain a front surface of the freeform imaging lens. The data points are calculated based on Snell's law, and a curve is obtained through the data points. A back surface is added to approximately keep the previous outgoing direction of rays from the front surface.

20 Claims, 11 Drawing Sheets

METHOD OF FREEFORM IMAGING LENS

CROSS-REFERENCE TO RELATED APPLICATIONS

This application claims all benefits accruing under 35 U.S.C. § 119 from China Patent Application No. 201310457594.4, filed on Sep. 30, 2013 in the China Intellectual Property Office, disclosure of which is incorporated herein by reference.

BACKGROUND

1. Technical Field

The present disclosure relates to a design method of freeform imaging lens, especially a freeform imaging lens with wide linear field-of-view (FOV).

2. Description of Related Art

Compared with conventional rotationally symmetric surfaces, freeform optical surfaces have higher degrees of freedom, which can reduce the aberrations and simplify the structure of the system in optical design. In recent years, with the development of advancing manufacture technologies, freeform surfaces have been successfully used in the imaging field, such as head-mounted-displays, reflective systems, varifocal panoramic optical systems and microlens arrays.

Traditional freeform imaging system design uses a spherical or aspherical system as the starting point, with some surfaces in the system replaced with freeform surfaces to obtain satisfactory results.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

References will now be made to the drawings to describe, in detail, various embodiments of the design method of the freeform imaging lens.

Figure 1:
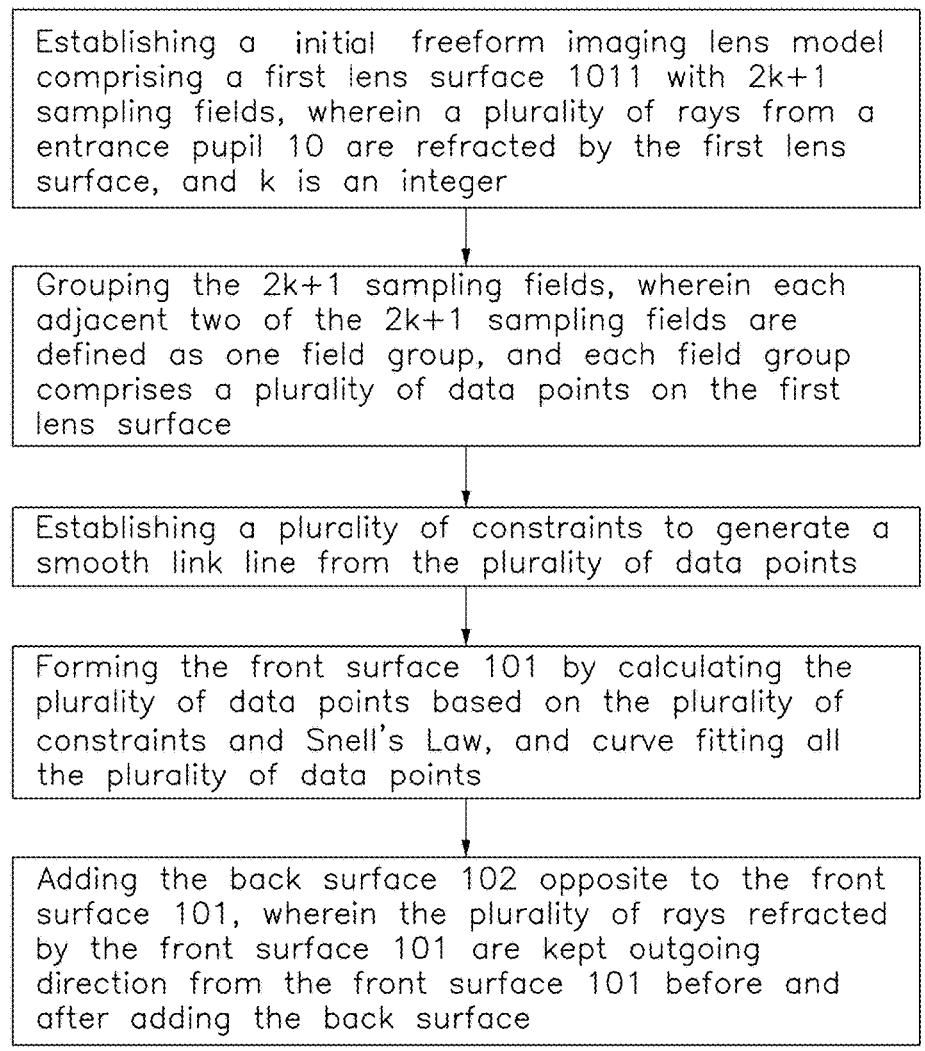
FIG. 1 shows a flow chart of one embodiment of a design method of a freeform imaging lens.
Figure 2:
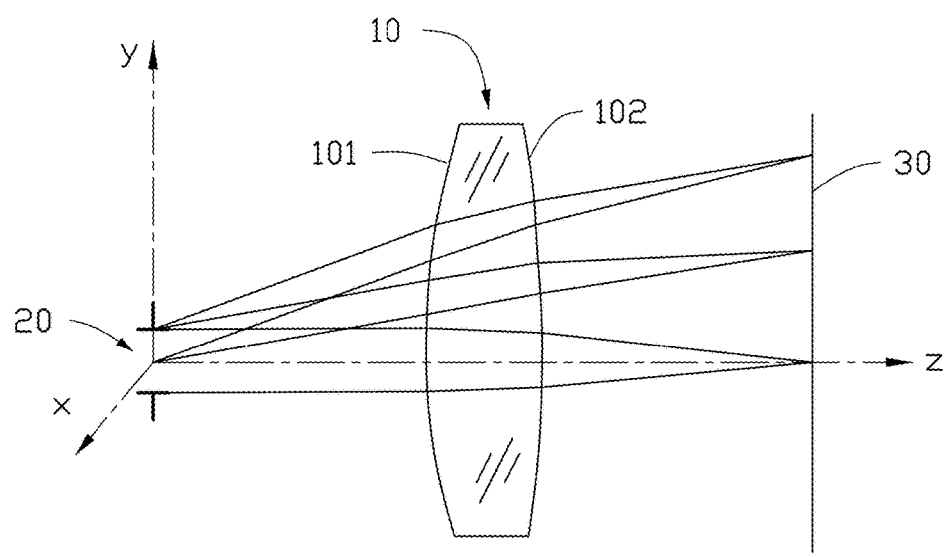
FIG. 2 is a schematic view of the freeform imaging lens.

Referring to FIGS. 1 and 2, a freeform imaging lens 10 is located between an entrance pupil 20 and an image plane 30. The freeform imaging lens 10 comprises a front surface 101 and back surface 102 opposite to the front surface 101. The front surface 101 faces the entrance pupil 10, and the back surface 102 faces the image plane 30. A plurality of rays from the entrance pupil 20 is refracted by the freeform imaging lens 10 and focus on the image plane 30 in the ideal case.

Figure 3:
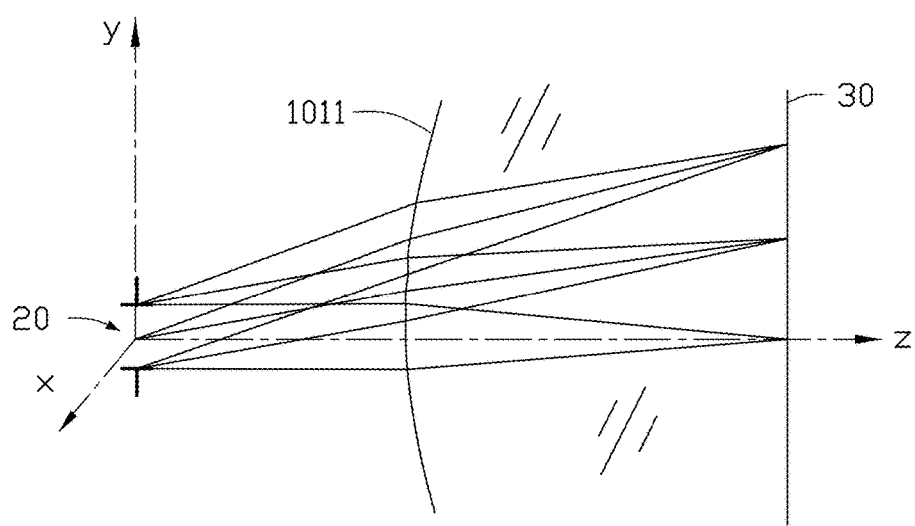
FIG. 3 shows a schematic view of one embodiment of initial freeform imaging lens in the design method of FIG. 1.

Referring also to FIG. 3, a design method of the freeform imaging lens 10 comprises the following steps:

step (S10), establishing a initial freeform imaging lens model comprising a first lens surface 1011 with 2k+1 sampling fields, wherein a plurality of rays from a entrance pupil 10 are refracted by the first lens surface, and k is an integer;

step (S20), grouping the 2k+1 sampling fields, wherein each adjacent two of the 2k+1 sampling fields are defined as one field group, and each field group comprises a plurality of data points on the first lens surface;

step (S30), establishing a plurality of constraints to generate a smooth link line from the plurality of data points;

step (S40), constructing the front surface 101 by calculating the plurality of data points based on the plurality of constraints and Snell's Law, and curve fitting all the plurality of data points; and step (S50), adding the back surface 102 opposite to the front surface 101, wherein the plurality of rays refracted by the front surface 101 are kept outgoing direction from the front surface 101 before and after adding the back surface.

In step (S10), the first lens surface 1011 can be planar, curved, or spherical. A coordinate system is established in the initial freeform imaging lens model. The coordinate origin O is located at the center of the entrance pupil 20. A z-axis is defined as the direction substantially perpendicular with the image plane 30 and passing through the center of the entrance pupil 20. The x-axis and y-axis are substantially perpendicular with each other and the z-axis. The plurality of one-dimensional sampling fields of the first lens surface 1011 are defined in a YOZ coordinate.

The FOV 2ω (±ω, symmetrically distributed on the two sides of z-axis) of the initial freeform imaging lens model is divided into 2k+1 sampling fields with equal interval Δω between each adjacent two sampling fields. So Δω can be expressed as:

$$\Delta\omega = \frac{\omega}{k} \tag{1}$$

Figure 4:
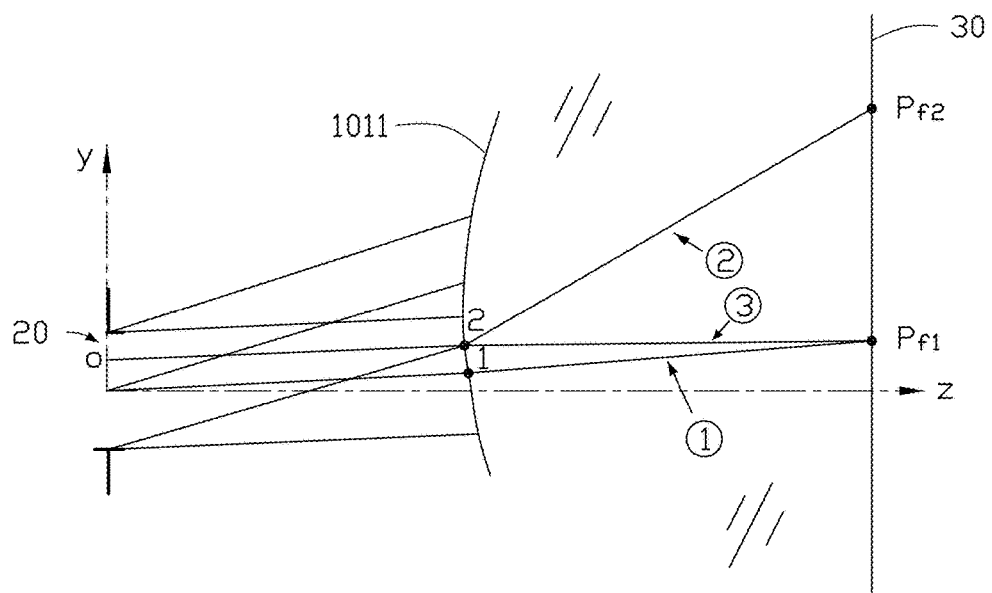
FIG. 4 shows a schematic view of one embodiment of a first model of the initial freeform imaging lens of FIG. 3.
Figure 5:
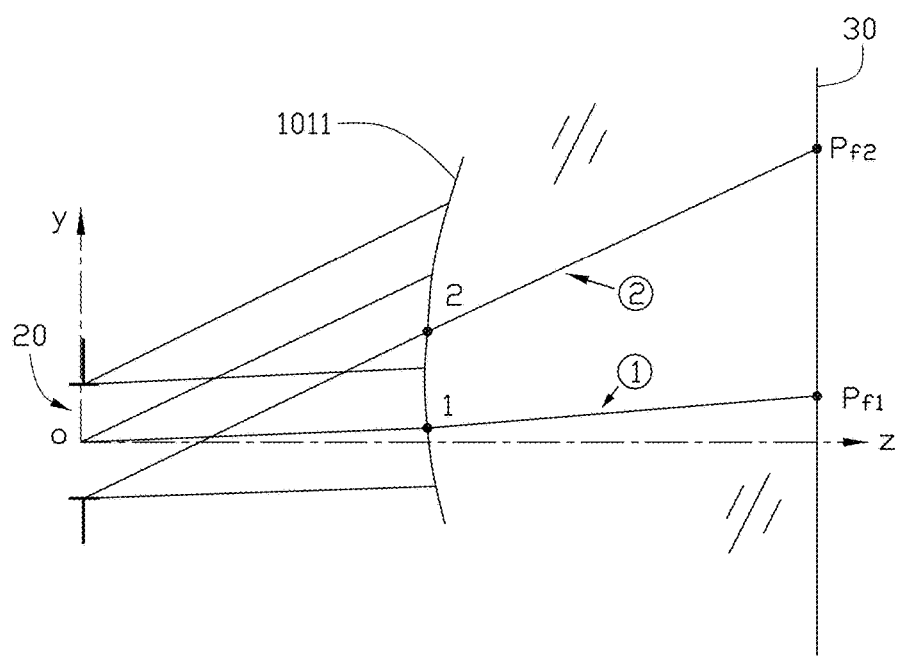
FIG. 5 shows a schematic view of one embodiment of a second model of the initial freeform imaging lens of FIG. 3.

The accuracy of the design is improved as the number k of sampling field increases. In one embodiment, the number k ranges from about 20 to about 40. Referring to FIG. 4, as k increases, the field angle decreases, and the beams of neighboring fields with fixed intervals generally have overlapping areas on the first lens surface 1011. Referring also to FIG. 5, when k decreases, the field angle increases, and the overlapping areas of neighboring fields gets smaller, until they disappear.

In step (S20), in the 2k+1 sampling fields, every two adjacent sampling fields are defined as one field group. Each field group comprises a first sampling field and a second sampling field. The first sampling field is defined as the field filled with rays adjacent to the z-axis. The second sampling field is defined as the sampling field filled with rays away from the z-axis. In one embodiment, the rays in the first sampling field fully fill the entrance pupil 20. A plurality of feature rays can be selected to design the freeform image lens 10. A chief ray ① from the center of the entrance pupil 20 intersects the first lens surface 1011 at a first data point 1, and refracted by the first lens surface 1011 to its first ideal image point $P_{f1}$ on the image plane 30. The rays in the second sampling field fully fill the entrance pupil 20. A marginal ray ② from the boundary of the entrance pupil 20 intersects with the chief ray ① at a second data point 2 on the first lens surface 1011. The marginal ray ② is refracted at its second ideal image point $P_{f2}$ on the image plane 30.

In one embodiment, referring to FIG. 4, the first sampling field is partly overlapped by the second sampling field. Thus there is a feature ray ③ intersecting the first lens surface 1011 at the second data point 2, and refracted on the first ideal image point $P_{f1}$. The first data point 1 and the second data point 2 can be calculated through the feature rays such as chief ray ①, the marginal ray ②, and the feature ray ③.

In one embodiment, referring to FIG. 5, the first sampling field is completely separated from the second sampling field. Thus the feature ray ③ does not exist, and the first data point 1 and the second data point 2 can be calculated through the feature rays such as the chief ray ① and the marginal ray ②. After the feature rays listed above used in each field group are defined, the plurality of data points on the front surface can be calculated based on the relationships between the incident and outgoing light rays.

In step (S30), to generate a smooth link line of the plurality of data points on the first lens surface, two special constraints can be employed during the calculation of the plurality of data points. A first constraint is used to establish the geometric relationships between adjacent field groups, and can be established with a surface normal. A second constraint called a stairs-distribution elimination constraint is used to improve the smoothness of the link line of the plurality of data points. With these constraints, the data points distribute regularly and form a smooth link line.

The step (S30) comprises the following substeps:

step (S31), establishing the first constraint of geometric relationships between the plurality of data points in adjacent field groups; and step (S32), establishing the second constraint of the stairs-distribution elimination constraint.

Figure 6:
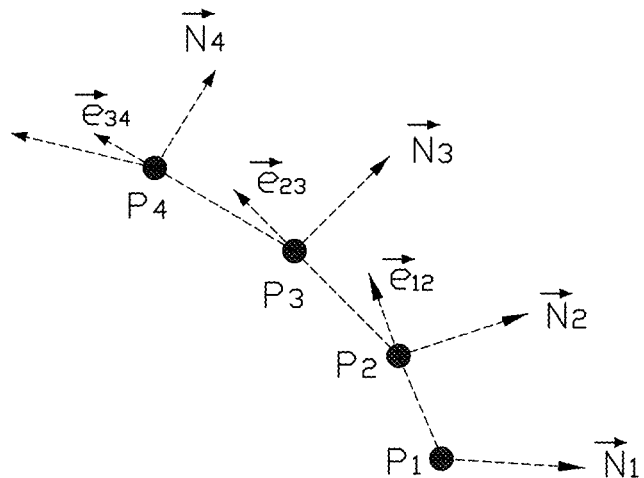
FIG. 6 shows schematic view of a constraint to establish geometric relationships between neighboring field groups using the normal vector at each data point.

In step (S31), the first constraint of the geometric relationships between adjacent field groups can be established with the surface normal vector at each data point. Furthermore, the plurality of data points calculated in the previous field group can be used during the calculation of the plurality of data points in the adjacent field group. Referring to FIG. 6, $P_3$ and $P_4$ are the data points needed to be calculated in the current field group, and $P_1$ and $P_2$ are the data points already calculated in the previous field group. The direction vector $\vec{e}_{23}$ from $P_2$ to $P_3$ is constrained to be perpendicular to the unit normal $\vec{N}_3$ at $P_3$, and the direction vector $\vec{e}_{34}$ from $P_3$ to $P_4$ is constrained to be perpendicular to the unit normal $\vec{N}_4$ at $P_4$. Thus, the first constraint can be written as:

$$\vec{N}_3 \cdot \vec{e}_{23} = 0 \tag{2}$$

$$\vec{N}_4 \cdot \vec{e}_{34} = 0 \tag{3}$$

The first constraint establishes the geometric relationships between neighboring field groups. The plurality of data points are no longer irregularly distributed after the first constraint is added. Moreover, in the first constraint, the original normal vector at each data point which determines the outgoing direction of light rays is perpendicular to the line connecting the adjacent point. As a consequence, the consistency of the normal vectors after curve fitting is approximately ensured, and the rays can be shifted in the expected directions.

Figure 7:
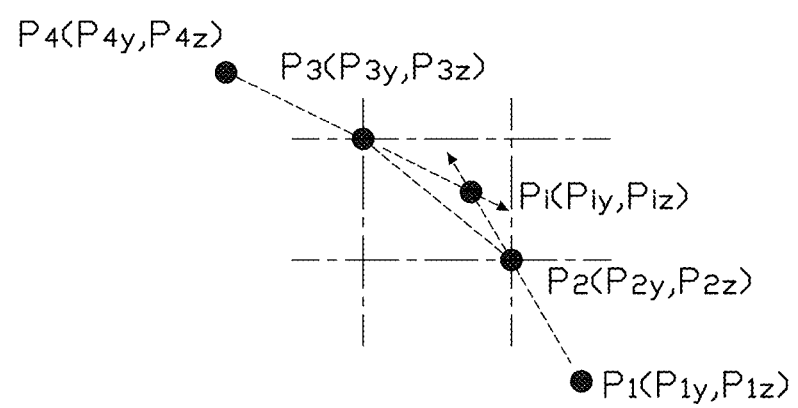
FIG. 7 shows a schematic view of one embodiment of a constraint of eliminating stairs-distribution.
Figure 7:
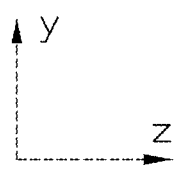

In step (S32), referring also to FIG. 7, $P_3$ and $P_4$ are the data points needed to be calculated in the current field group, and $P_1$ and $P_2$ are the data points already calculated in the previous field group. The intersected point $P_i$ of the two lines (line $P_1$-$P_2$ and line $P_3$-$P_4$) which connect the two data points in each group is between $P_2$ and $P_3$. Thus the y coordinate $P_{iy}$ of $P_i$ is constrained to be between the y coordinates of $P_2$ and $P_3$, and the z coordinate $P_{iz}$ of $P_i$ is constrained to be between the z coordinates of $P_2$ and $P_3$. The second constraint can be written as:

$$(P_{2y} - P_{iy})(P_{3y} - P_{iy}) < 0 \tag{4}$$

$$(P_{2z} - P_{iz})(P_{3z} - P_{iz}) < 0 \tag{5}$$

Using the second constraint, the stairs-distribution can be eliminated and a smooth link line of the plurality of data points can be obtained. Therefore, an accurate fitted surface contour is achieved and the deviation of the plurality of data points from the fitted contour is further reduced, which contributes to maintaining the expected imaging relationship.

In step (S40), with the first constraint and the second constraint established, all the data points can be calculated and the front surface 101 can be obtained. In the ideal case, the feature rays used in each field group are refracted by the front surface 101 to their ideal image points respectively based on Snell's law. The vector form of Snell's law can be written as:

$$n'(\vec{r}' \times \vec{N}) = n(\vec{r} \times \vec{N}) \tag{6}$$

wherein $\vec{r} = (\alpha, \beta, \gamma)$, $\vec{r}' = (\alpha', \beta', \gamma')$ are the unit vectors along the directions of the incident and exit ray, n is the refractive index of the medium around the freeform imaging lens 10, and n' is the refractive index of the material of the freeform imaging lens 10. $\vec{N} = (i, j, k)$ represents the unit normal vector at the data point. In the YOZ coordinate, equation (6) can be written in the scalar form:

$$n'\beta' - n\beta = j(n' \cos I' - n \cos I) \tag{7}$$

$$n'\gamma' - n\gamma = k(n' \cos I' - n \cos I) \tag{8}$$

wherein I and I' are the angles of incidence and refraction respectively, and cos I and cos I' can be obtained by:

$$\cos I = (\vec{r} \cdot \vec{p}) = \beta j + \gamma k \tag{9}$$

$$\cos I' = \frac{1}{n'}\sqrt{n'^2 - n^2 + n^2 \cos^2 I}. \tag{10}$$

In addition, the angle between each incident ray and the optical axis (OZ) is equal to its field angle θ respectively. So, for each ray, a tangent relation is required:

$$\tan\theta = \frac{\beta}{\gamma}. \quad (11)$$

The components of $\vec{r}$ and $\vec{r}'$ of each feature ray used in Eq. (7-11) can be easily written out with the coordinates of its intersections with the entrance pupil 20, the first lens surface 1011, and the plurality of ideal image points.

During the calculation of each two of the plurality of data points in each field group is taken as a mathematical optimization problem. The first constraints and the second constraints used in the optimization to obtain the data points that can generate a smooth link line.

As an exact solution may be not achievable to satisfy Snell's law for all the feature rays in each field group, Equation (7, 8, 11) are also taken as constraints to control the direction of each feature ray in the optimization process. So, the constraints used to obtain the corresponding optimum solution in each group are Eq. (2-5, 7, 8, 11). The constraints Eq. (7, 8, 11) will be used several times as there are more than one ray in a field group.

The y and z coordinates $(y_1, z_1)$, $(y_2, z_2)$ as well as the y and z component $(j_1, k_1)$, $(j_2, k_2)$ of surface normal vector of the two data points $(P_1, P_2)$ in each field group are set as unknown variables. Therefore, all the constraints can be expressed in terms of $(y_1, z_1, y_2, z_2, j_1, k_1, j_2, k_2)$. A merit function $\Phi(y_1, z_1, y_2, z_2, j_1, k_1, j_2, k_2)$ is formed by the sum of residual squares of the constraints. The optimization process is to minimize $\Phi$ and to obtain the corresponding $(y_1, z_1)$ $(y_2, z_2)$. The optimization can be completed by commercial optimization software.

Figure 8:
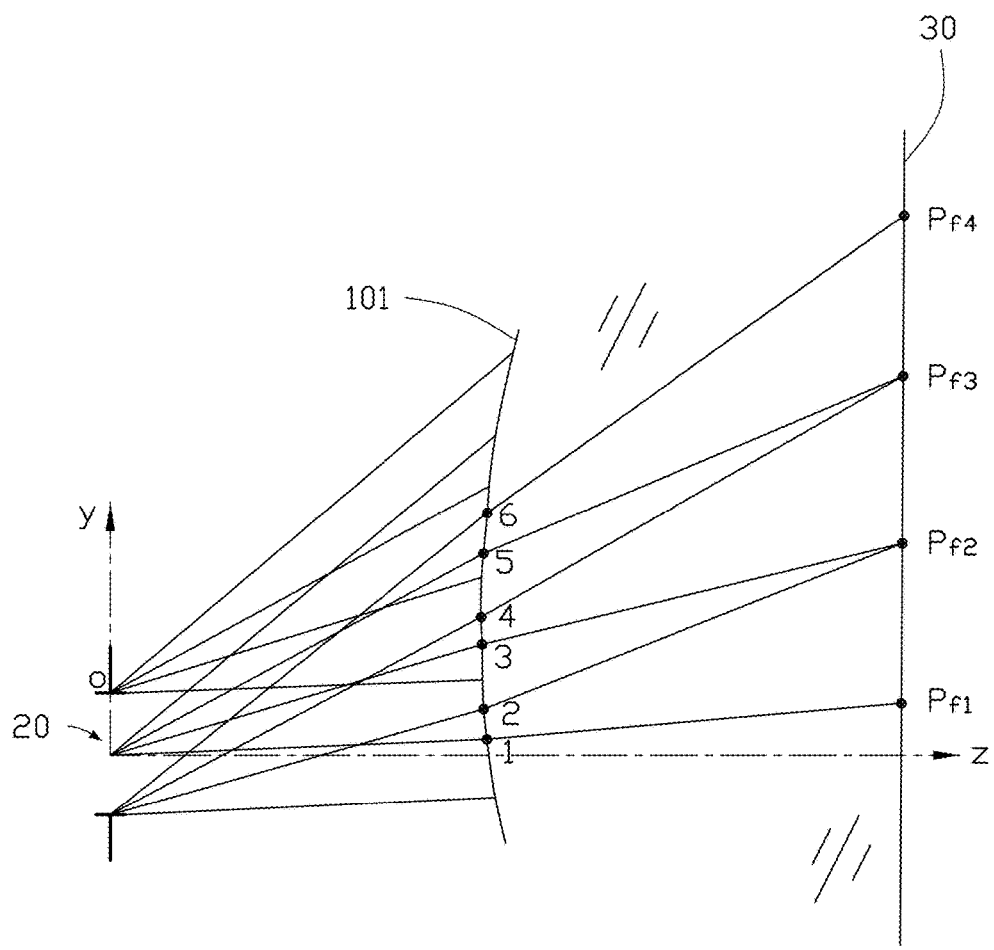
FIG. 8 shows a schematic view of one embodiment of calculating a plurality of data points on a front surface of the initial freeform imaging lens.

Further referring to FIG. 8, the algorithm can start from the group of the two adjacent sampling fields containing the marginal field. When the coordinates $(y_1, z_1)$, $(y_2, z_2)$ of the first data point 1 in the first sampling field and the second data point 2 in the second sampling field are obtained, the second sampling field and the next adjacent field are taken as the next field group, and a third data point 3 and a third data point 4 can then be calculated with the same method. The above mentioned process is repeated until the all the data points are calculated.

When calculating the first data point 1 and the second data point 2, as no previous adjacent field group exists, they can be obtained with the constraints Eq. (3, 7, 8, 11). The front surface 101 is finally obtained after curve fitting with all the data points.

In step (S40), the back surface 102 can be determined after the front surface 101 is determined. Furthermore, after adding the back surface 102, the plurality of rays refracted by the front surface 101 will keep the outgoing direction from the front surface. Thus the back surface 102 will not change the outgoing direction of the rays, and the plurality of image points will not change their positions. Therefore, the freeform image lens 10 is obtained.

Embodiment

As an example, a system having an f-θ single lens with a wide linear FOV has been designed. The f-θ lens is used for a scanning range of ±210 mm in the y direction. The system has a linear FOV of ±60°, and it is divided equally into 61 fields with a 2° interval during the design process. The scanning width y (mm) has a linear relationship with the scanning angle θ(°) for an f-θ single lens, and the f-θ property can be written as:

$$y = \frac{210}{60} \cdot \theta = 3.5 \cdot \theta. \quad (12)$$

The system has a circular entrance pupil with a 3 mm diameter. The scanning light is a 780 nm infrared laser. The material of the lens is poly(methyl methacrylate) (PMMA).

Next, the starting point of the system was designed with the design method of the freeform imaging lens. The surface type of the front surface chooses to be XY polynomials. An aspherical surface which approximately keeps the previous outgoing direction of light beams from the front surface is inserted as the back surface of the lens. As the system is symmetric to the X-Z plane, only half of the full FOV (0° to 60°) needs to be optimized. In this design method, the front surface consists of two halves. The surface for −60° to 0° FOV is symmetrical to the surface for 0° to 60° FOV. Only half of the single lens for 0° to 60° fields needs to be generated because of the plane-symmetrical structure.

If the data points are calculated based only on the equations to control the ray direction (Eq. (7, 8, 11)), these points are irregularly distributed. When the constraint to establish the geometric relationships between adjacent field groups using the surface normal is added (Eq. (2, 3)), the data points are no longer irregularly distributed. When the stairs-distribution elimination constraint (Eq. (4, 5)) is finally added, the stairs-distribution is removed and the data points obtained can generate a smooth link line. An analytical formula of the front surface of the f-θ single lens with a wide linear FOV is described as:

$z=-0.005309794568632y+$
  $0.000535944896262741y^2+1.98142772592e-$
  $005y^3; -2.09286065882193e-007y^4+$
  $7.786152559625e-010y^5$

The distance between the entrance pupil and the front surface is about 42.9649072220278 mm, and the distance between the front surface and the image plane 30 is about 237.0350928 mm.

Figure 9:
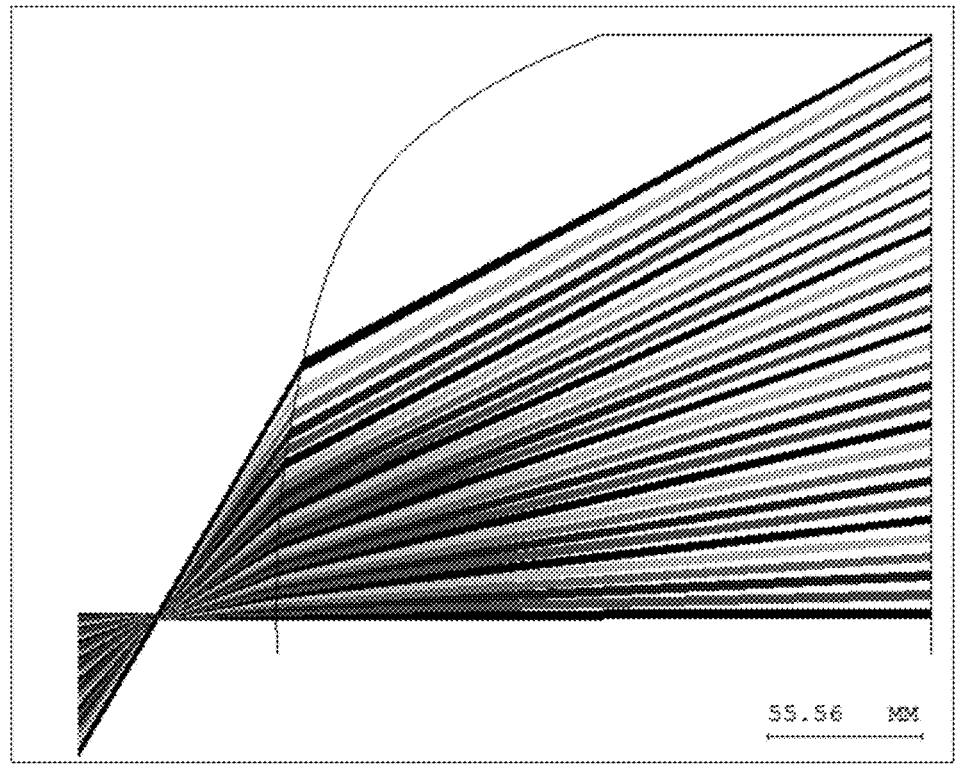
FIG. 9 shows a schematic view of one embodiment of a layout result of the initial freeform imaging lens.
Figure 10:
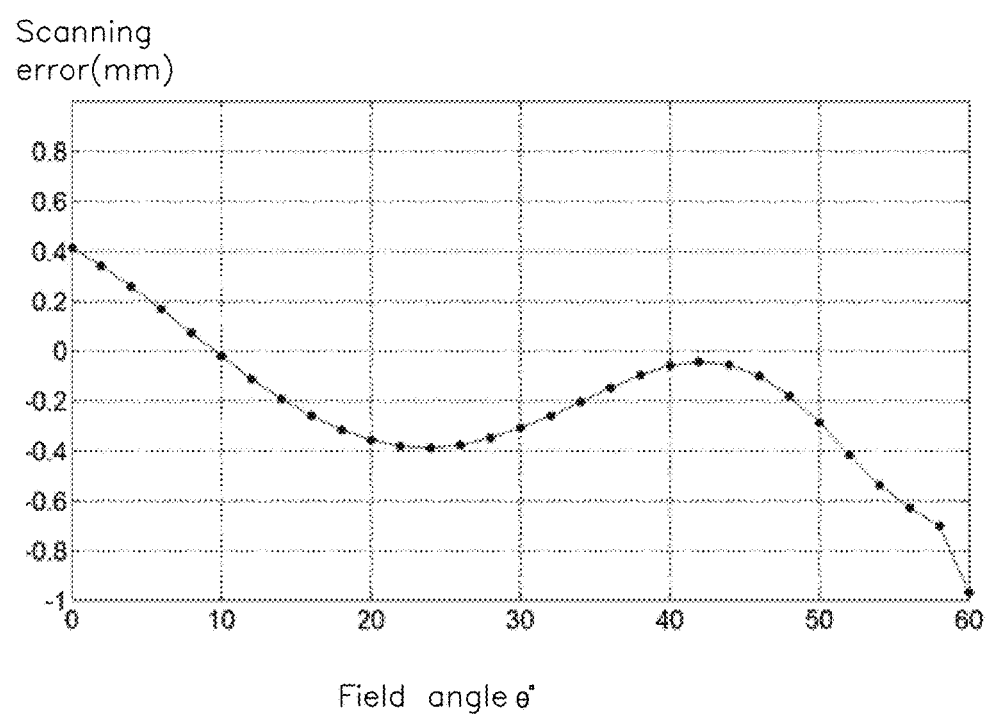
FIG. 10 shows a schematic view of one embodiment of a scanning error of the initial freeform imaging lens.

FIG. 9 shows a design effect of the front surface. FIG. 10 shows the scanning error of each field. In this paper, the scanning error is defined as:

$$\Delta h = h' - h \quad (13)$$

where h is the ideal image height, and h' is the actual image height. For most of the sampling fields (0° to 50°), the error is within ±0.4 mm. For some larger field angles, the error is no more than ±1 mm. Thus. the light beams are well controlled.

Figure 11:
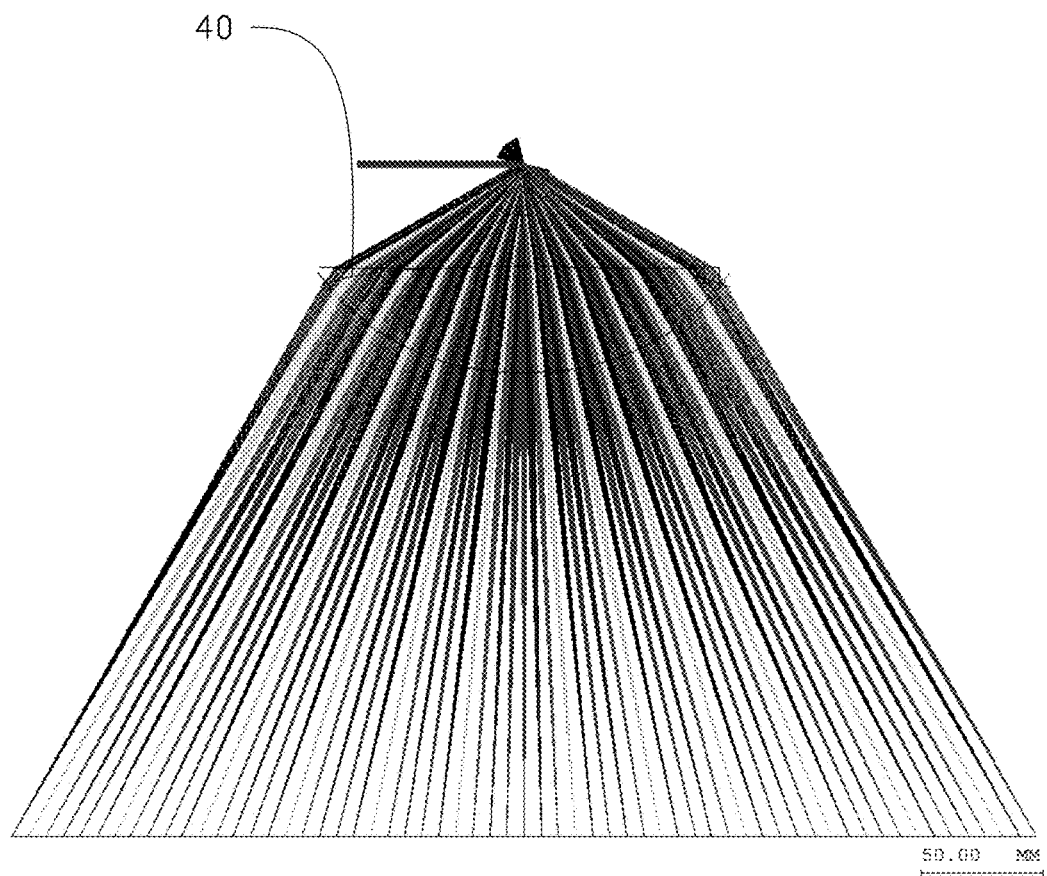
FIG. 11 shows a schematic view of one embodiment of an f-θ freeform imaging lens with the design method of FIG. 1.

In addition, referring to FIG. 11, a rotating mirror 40 is added to realize laser scanning. The f-θ single lens with a wide linear FOV can be further optimized.

The design method of freeform imaging lens 10 has many advantages. The aperture size of the entrance pupil in a wide FOV system is considered during the calculation of the data points on the front surface, and the calculation of the data points on the front surface is a mathematical optimization problem. Furthermore, two special constraints are employed to find the appropriate data points which can generate a smooth link line. The constraint using a surface normal vector at each data point establishes the geometric relationships between adjacent field groups. Moreover, the consistency of the normal vectors after curve fitting can be maintained. The smoothness of the link line is improved effectively by adding the stairs-distribution elimination constraint. With these constraints, a smooth and accurate surface contour can be obtained after curve fitting. The coordinates and normal vectors of the original data points can be approximately satisfied, and the expected imaging relationship can be ensured. The front surface can be a freeform surface which is taken as the starting point for further optimization. The design method to calculate the data points on the front surface is effective. The design method of the freeform imaging lens can be extended to design a three-dimensional freeform surface for imaging or illumination optics.

It is to be understood that the above-described embodiments are intended to illustrate rather than limit the disclosure. Any elements described in accordance with any embodiments is understood that they can be used in addition or substituted in other embodiments. Embodiments can also be used together. Variations may be made to the embodiments without departing from the spirit of the disclosure. The above-described embodiments illustrate the scope of the disclosure but do not restrict the scope of the disclosure.

Depending on the embodiment, certain of the steps of methods described may be removed, others may be added, and the sequence of steps may be altered. It is also to be understood that the description and the claims drawn to a method may include some indication in reference to certain steps. However, the indication used is only to be viewed for identification purposes and not as a suggestion as to an order for the steps.

What is claimed is:

1. A method for manufacturing a freeform imaging lens to be located between an entrance pupil and an image plane, comprising:
   providing an initial freeform imaging lens comprising a first lens surface element, wherein a field-of-view $2\omega$ of the first lens surface element is divided into $2k+1$ sampling fields, a plurality of rays from an entrance pupil are refracted by the first lens surface element, and forming a plurality of image points on an imaging plane;
   grouping the $2k+1$ sampling fields, wherein each adjacent two of the $2k+1$ sampling fields are defined as one field group, and each field group comprises a plurality of data points on the first lens surface, and k is an integer;
   establishing a plurality of constraints to generate a smooth link line of the plurality of data points;
   processing a front surface of the freeform imaging lens on the freeform imaging lens by calculating the plurality of data points based on the plurality of constraints and Snell's Law, and curve fitting all the plurality of data points on the first lens surface element, wherein the front surface of the freeform imaging lens faces the entrance pupil;
   processing a back surface of the freeform imaging lens opposite to the front surface on the freeform imaging lens, wherein the plurality of rays refracted by the front surface are kept outgoing direction from the front surface, the back surface faces the image plane;
   manufacturing the freeform imaging lens corresponding to the front surface and the back surface.

2. The method of claim 1, wherein a coordinate system is established in the initial freeform imaging lens, the origin of the coordinate system is located at the center of the entrance pupil; a z-axis is defined as a direction substantially perpendicular with the image plane through the entrance pupil; and the x-axis and y-axis are substantially perpendicular with each other and the z-axis.

3. The method of claim 1, wherein the field-of-view $2\omega$ of the initial freeform imaging lens model is divided into $2k+1$ sampling fields with equal interval $\Delta\omega$ between each adjacent two sampling fields.

4. The method of claim 1, wherein each field group comprises a first sampling field and a second sampling field, the first sampling field is defined as the sampling field filled with rays adjacent to the z-axis, and the second sampling field is defined as the sampling field filled with rays away from the z-axis.

5. The method of claim 4, wherein the rays in the first sampling field fully fill the entrance pupil, and a chief ray from the center of the entrance pupil intersects the first lens surface at a first data point, and refracted by the first lens surface to its first ideal image point $P_{f1}$ on the image plane.

6. The method of claim 5, wherein the rays in the second sampling field fully fills the entrance pupil, and a marginal ray from the boundary of the entrance pupil is intersected with the chief ray at a second data point on the first lens surface element, and refracted on its second ideal image point $P_{f2}$ on the image plane.

7. The method of claim 6, wherein the first sampling field is partly overlapped with the second sampling field, and there is a feature ray intersected with the first lens surface element at the second data point 2, and refracted on the first ideal image point $P_{f1}$.

8. The method of claim 7, the first data point and the second data point are calculated through the feature rays selected from the group consisting of the chief ray, the marginal ray, and the feature ray.

9. The method of claim 6, wherein the first sampling field is completely separated from the second sampling field, and the first data point and the second data point are calculated through the chief ray and the marginal ray.

10. The method of claim 1, wherein the establishing a plurality of constraints comprises:
    establishing a first constraint of geometric relationships between the plurality of data points in adjacent field groups; and
    establishing a second constraint of a stairs-distribution elimination constraint.

11. The method of claim 10, wherein $P_3$ and $P_4$ are defined as the data points to be calculated in the current field group, $P_1$ and $P_2$ are defined as the data points already calculated in the adjacent field group, the direction vector $\vec{e}_{23}$ from $P_2$ to $P_3$ is constrained to be substantially perpendicular to the unit normal $\vec{N}_3$ at $P_3$, the direction vector $\vec{e}_{34}$ from $P_3$ to $P_4$ is constrained to be substantially perpendicular to the unit normal $\vec{N}_4$ at $P_4$, and the first constraint is written as:

$$\vec{N}_3 \cdot \vec{e}_{23} = 0$$

and $$\vec{N}_4 \cdot \vec{e}_{34} = 0$$

12. The method of claim 10, wherein $P_3$ and $P_4$ are defined as the data points to be calculated in the current field group; $P_1$ and $P_2$ are defined as the data points already calculated in the previous field group; the intersected point $P_i$ of the line $P_1$-$P_2$ and line $P_3$-$P_4$ is between $P_2$ and $P_3$; the y coordinate $P_{iy}$ of $P_i$ is constrained to be between the y coordinates of $P_2$ and $P_3$, the z coordinate $P_{iz}$ of $P_i$ is constrained to be between the z coordinates of $P_2$ and $P_3$, and the second constraint is written as:

$$(P_{2y}-P_{iy})(P_{3y}-P_{iy})<0$$

and $$(P_{2z}-P_{iz})(P_{3z}-P_{iz})<0$$

13. The method of claim 1, wherein a vector form of each of the plurality rays of Snell's law is written as:

$$n'(\vec{r}'\times\vec{N})=n(\vec{r}\times\vec{N})$$

wherein $\vec{r}=(\alpha, \beta, \gamma)$ and $\vec{r}'=(\alpha', \beta', \gamma')$ are unit vectors along the directions of the incident and exit ray; n is a refractive index of medium around the freeform imaging lens; n' is a refractive index of the material of the freeform imaging lens; $\vec{N}=(i, j, k)$ represents a unit normal vector at the data point.

14. The method of claim 13, wherein each of the plurality of rays satisfies:

$$n'\beta'-n\beta=j(n'\cos I'-n\cos I)$$

and $$n'\gamma'-n\gamma=k(n'\cos I'-n\cos I)$$

wherein I and I' are the angles of incidence and refraction respectively.

15. The method of claim 14, wherein cos I and cos I' are obtained by:

$$\cos I = (\vec{r}\cdot\vec{p}) = \beta j + \gamma k \text{ and}$$

$$\cos I' = \frac{1}{n'}\sqrt{n'^2 - n^2 + n^2\cos^2 I}.$$

16. The method of claim 14, wherein an angle between each ray and optical axis is equal to a field angle θ of the ray, and a tangent relation is $$\tan\theta = \frac{\beta}{\gamma}.$$

17. The method of claim 1, wherein k ranges from about 20 to about 40.

18. The method of claim 1, further comprising a step of optimizing the freeform imaging lens by inserting a rotating mirror to realize laser scanning.

19. The method of claim 1, wherein the plurality of image points of the plurality of rays refracted by the front surface of the freeform imaging lens are not changed before and after adding the back surface.

20. The method of claim 1, wherein the freeform imaging lens is configured to refract a plurality of rays emitted from the entrance pupil to make the plurality of rays focus on the image plane.

* * * * *

UNITED STATES PATENT AND TRADEMARK OFFICE
CERTIFICATE OF CORRECTION

PATENT NO. : 9,996,635 B2  
APPLICATION NO. : 14/316739  
DATED : June 12, 2018  
INVENTOR(S) : Jun Zhu et al.

Page 1 of 1

It is certified that error appears in the above-identified patent and that said Letters Patent is hereby corrected as shown below:

On the Title Page

And in the Specification, Column 1, Line 1 please change the title to "DESIGN METHOD OF FREEFORM IMAGING LENS".

Signed and Sealed this  
Twenty-fifth Day of June, 2019

Andrei Iancu  
*Director of the United States Patent and Trademark Office*